United States Patent [19]

Shiozaki et al.

[11] Patent Number: 4,658,356
[45] Date of Patent: Apr. 14, 1987

[54] CONTROL SYSTEM FOR UPDATING A CHANGE BIT

[75] Inventors: Kenichi Shiozaki, Odawara; Makoto Kishi, Ashigarakamigun; Tomoatsu Yanagita, Machida; Kanji Kubo, Hadano, all of Japan

[73] Assignee: Hitachi, Ltd., Tokyo, Japan

[21] Appl. No.: 553,235

[22] Filed: Nov. 18, 1983

[30] Foreign Application Priority Data

Nov. 22, 1982 [JP] Japan .................. 57-203630

[51] Int. Cl.⁴ ............................................. G06F 13/14
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,084,231 | 4/1978 | Capozzi | 364/200 |
| 4,149,245 | 4/1979 | Gannon | 364/200 |
| 4,277,826 | 7/1981 | Collins et al. | 364/200 |
| 4,322,815 | 3/1982 | Broughton | 364/200 |
| 4,323,968 | 4/1982 | Capozzi | 364/200 |
| 4,394,731 | 7/1983 | Flusche | 364/200 |
| 4,464,712 | 8/1984 | Fletcher | 364/200 |
| 4,491,911 | 1/1985 | Sato | 364/200 |

*Primary Examiner*—David Y. Eng
*Attorney, Agent, or Firm*—Antonelli, Terry & Wands

[57] ABSTRACT

Change bits are provided in correspondence with storage information units (blocks or pages) of a storage, and indicate whether or not a "store" operation has been performed into the corresponding storage information units. The change bits are retained in a first retention device in correspondence with the storage information units, and a copy of the change bits in the first retention device is retained in a second retention device. When the store operation is performed to effect a storing of data into the storage, a control device refers to the change bit retained by the second retention device and controls updating of the change bit of the first retention device in accordance with the indication of the change bit referred to.

14 Claims, 2 Drawing Figures

CONTROL SYSTEM FOR UPDATING A CHANGE BIT

BACKGROUND OF THE INVENTION

The present invention relates to a control system for updating a change bit in a data processing system.

In a data processing system of the virtual storage type, a logical space identified by a logical address is located in an external storage. The logical space is divided into blocks or pages of a predetermined storage information unit, for example, 2048 bytes. In order to execute data processing, a central processing unit rolls the blocks containing data to be processed from the external storage into a main storage in block units. The blocks which are not used with a high frequency are rolled out from the main storage and stored in the external storage of larger size, whereas the blocks which are used with a high frequency are located in the main storage or in a smaller buffer storage.

When a "store" operation is effected to store data into the block or change data in the block in some way during the location of this block in the main storage, the content of the particular block needs to be rolled out to the external storage at the end of a certain time period to update the block in the external storage. In contrast, when a storing of data into the block has not been effected, the content of the block need not be rolled out to the external storage because a correct copy of the block already exists in the external storage. Therefore, change bits (C bits) are set in correspondence with the storage information units (blocks) of the main storage, and when the store operation is performed in connection with a selected unit (block), this is indicated by the change bit. Whether or not the corresponding block needs to be rolled out from the main storage to the external storage is then determined by the indication of the change bit. Such a system has been introduced by C. T. Gibson in "Time-Sharing In The IBM System/360: Model 67" on pages 61-78 of "Proceedings Spring Joint Computer Conference, 1966". The C bit is held in a storage protection unit within a storage control unit, and it is referred to and updated for every access to any storage unit in the system, such as the main storage, an intermediate buffer storage or work storage, a buffer storage or cache, etc.

With enhancement in the operating speed of a data processing system, it is required to correspondingly enhance the speeds of the accesses to a storage and a storage protection unit. To this end, some of the C bits held in a storage control unit are retained as a copy in a fast accessible retention unit within each central processing unit. According to this arrangement, in each central processing unit, when a "store" operation is performed to store data into a buffer storage or cache having a copy of some of the data stored in the main storage, only the C bit which comprises the copy in the retention unit within the central processing unit is updated. The C bit indicates whether or not the content of the corresponding block (page) is to be rolled out to an external storage when the block is expelled from the main storage. It is, accordingly, indispensable that the storing of data into the storage, including the buffer storage, be precisely reflected upon the C bit. To this end for fetching the content of the C bit, therefore, it is generally required to return to the storage protection unit both the C bit in the storage protection unit and the copy C bit in the central processing unit and to thereafter fetch the C bit from the storage protection unit. Further, in a multiprocessor complex wherein the main storage is shared by a plurality of central processing units, when one CPU fetches the C bit, it needs to fetch the C bit in the storage protection unit, the copy C bit in the CPU itself and the copy C bits in the other CPUs. This results in a complicated control arrangement, and forms a factor contributing to degradation in the performance of the system.

In general, the C bit is unitarily handled as one of the bits of a storage protection key totaling seven bits, which include four bits forming the access control bits (ACC bits), a fetch protection bit (F bit) and a reference bit (R bit), as described in the aforementioned literature. The definitions of these bits are disclosed in "IBM System/370 Principles of Operation" (GA22-7000-3, January 1973), pp. 33 and 34.

SUMMARY OF THE INVENTION

An object of the present invention is to provide a control system which can peform the updating of a C bit faster and which reflects a correct C bit.

The present invention is characterized by first retention means to retain change bits (C bits) which indicate, in correspondence with predetermined storage information units of a storge, whether or not a "store" operation for storing data into the corresponding storage information units has been performed, and second retention means to retain a copy of the change bits, so that in the event of a "store" operation involving the inserting of data into the storage, updating of the change bit of said first retention means is controlled in accordance with the value of the change bit retained by said second retention means,

DESCRIPTION OF THE PREFERRED EMBODIMENTS

An embodiment of the present invention will be described in detail with reference to the drawings.

Figure 1:
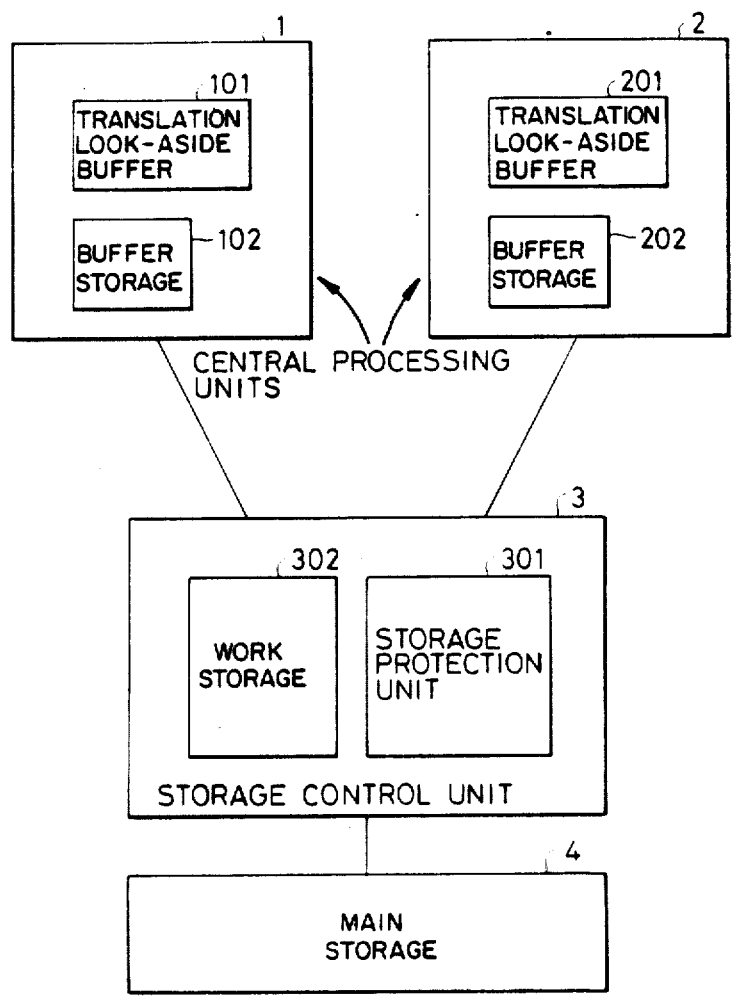
FIG. 1 is a block diagram of an example of a data processing system to which the present invention is applied.

FIG. 1 illustrates a data processing system of the multiprocessor type in which two central processing units 1, 2, share a main storage 4. The respective central processing units 1, 2 include address translation look-aside buffers 101, 201 which serve to translate a logical address into a real address, and buffer storages 102, 202 which are smaller in capacity and faster in operation than the main storage 4 and which retain as copies some of the data held by the main storage 4. The translation look-aside buffers 101, 201 also retain the copies of storge protection keys, as will be described later.

A storage control unit 3 has a storage protection unit 301 which retains storage protection keys corresponding to the respective blocks of data stored in the main storage 4. The storage control unit 3 also has a work storage 302, which forms a storage of 3-level hierarony along with the main storage 4 and buffer storages 102, 202. Storages of 3-level hierarchy are disclosed, for example, in Japanese Laid-Open Patent Application No. 52-30130 and Japanese Laid-Open Application No. 52-71138.

Figure 2:
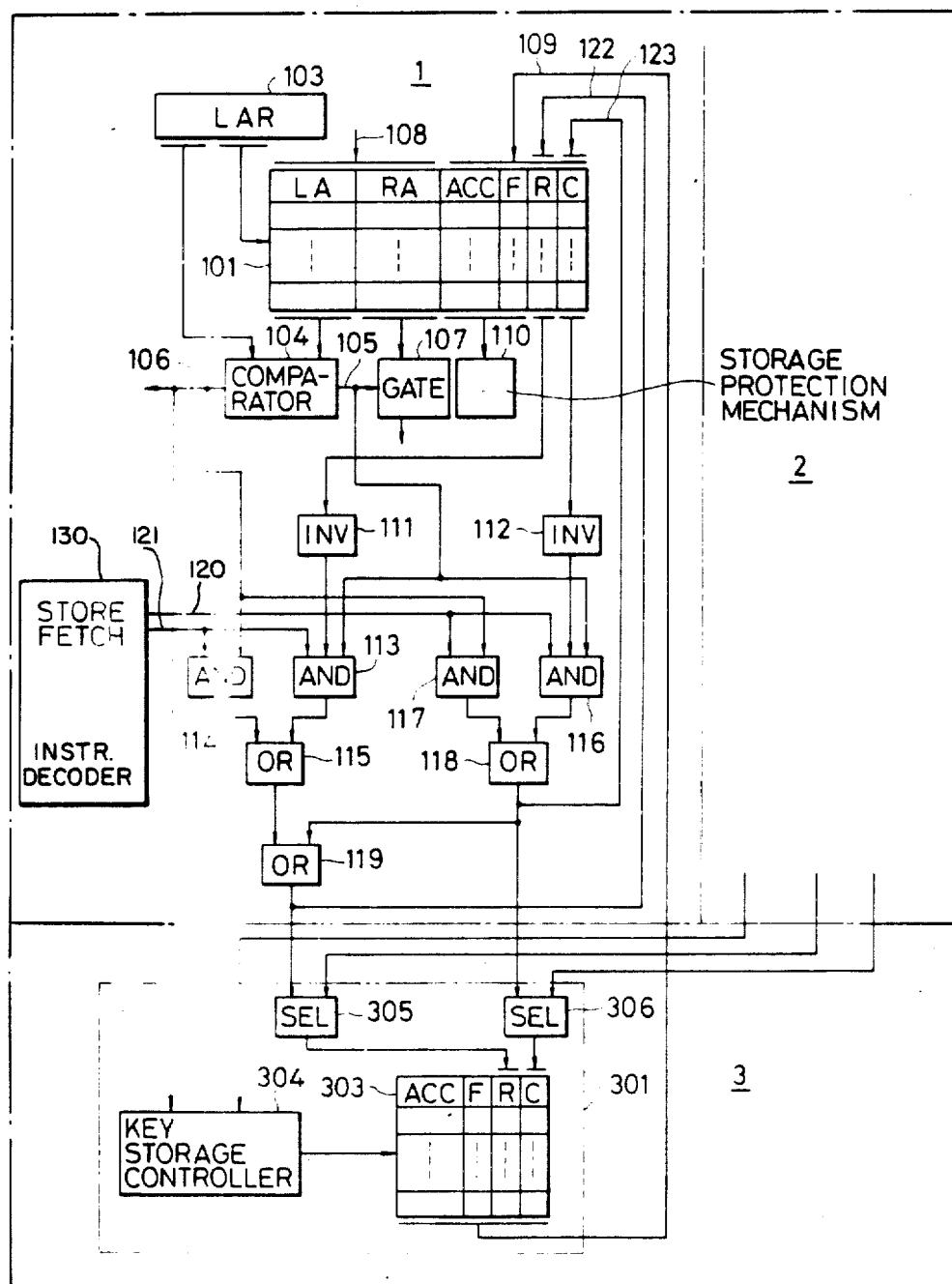
FIG. 2 is a block diagram showing an embodiment of the present invention.

FIG. 2 shows an embodiment of the present invention; however, only those details of the central processing unit and storage control unit necessary to an understanding of the present invention are specifically shown, it being understood that the basic configuration of such units is well known as indicated by the above-referenced publications.

Referring to FIG. 2, the storage protection keys are retained in a key storage 303 within the storage protection unit 301 of the storage control unit 3. The key storage 303 has a large number of entries. The main storage 4 is divided into predetermined storage information units, for example, blocks of 2048 bytes each. The storage protection keys corresponding to the blocks are retained in the respective entries of the key storage 303, and they are fetched and stored under the control of a key storage controller 304. As stated before, each storage protection key consists of the four ACC bits and the single F, R and C bits. The ACC bits and the F bit indicate the propriety of an access to the storage, and have a value set for the corresponding block. The R bit and the C bit are "0" at the beginning. The bits other than the C bit are not always necessary for the present invention.

In compliance with a request for access to the storage, the key storage controller 304 fetches the corresponding storage protection key, determines whether the requested access is to be allowed in accordance with the ACC bits and the F bit and updates the R bit and the C bit. The R bit and the C bit are rendered "1" in response to the "store" request, while only the R bit is rendered "1" in response to the "fetch" request. The storage protection based on the ACC bits and the F bit does not form any characterizing feature of the present invention, and is not illustrated.

Regarding the central processing units, only one CPU 1 is illustrated in detail to show the portion thereof which relates to this invention. The CPU 2 is identical to the CPU 1 insofar as the requirements of the present invention, and so, details thereof are not shown. The translation look-aside buffer 101 has a large number of entries, and holds the translation pairs of the logical address (LA) and the real address (RA) in the respective entries. The translation look-aside buffer 101 has the content of the entry fetched, using as an address a part of a logical address set in a logical address register (LAR) 103. The logical address fetched from the translation look-aside buffer 101 is compared by a comparator 104 with the upper digit part of the logical address of the LAR 103. Upon coincidence, a gate 107 is enabled by a coincidence signal delivered from the comparator 104 to a line 105, and the corresponding real address is outputted as a real address for the logical address set in the LAR 103. In case of noncoincidence, a noncoincidence signal is delivered to a line 106, to indicate that an address translation pair corresponding to the logical address set in the register 103 does not exist in the translation look-aside buffer 101. In the case where the noncoincidence signal has been generated, a real address is found by a well-known method using an address translation table and this real address is stored into the translation look-aside buffer 101 through a line 108.

Each entry of the translation look-aside buffer 101 also holds a copy of the storage protection key paired with the address translation pair. The present invention is characterized by retaining the copy of at least the C bits in the translation look-aside buffer, and the embodiment of FIG. 2 provides an arrangement where all the storage protection keys are retained as a copy. The storage protection key is fetched from the key storage 303 when the key storage controller 304 of the storage control unit 3 responds to the noncoincidence signal from the comparator 104, whereupon the key is stored into the translation look-aside buffer 101 through a line 109 simultaneously with the store of the address translation pair.

The storage protection key is fetched from the translation look-aside buffer 101 along with the address translation pair. The ACC bits and the F bit are applied to a storage protection mechanism 110, and are subjected to well-known storage protection processing. The R bit and C bit are respectively applied to inverters 111 and 112. Each of the inverters 111 and 112 provides an output of "1" for an input of "0" and vice versa, as is well known. The outputs of the inverters 111 and 112 are respectively applied to AND gates 113 and 116. The AND gate 113 receives the coincidence signal from the comparator 104 and a fetch request signal for the storage from instruction decoder 130 through a line 121. If the R bit is "0" at the time of receipt of the fetch request for the storage, the output of the AND gate 113 becomes "1", and the R bit in the translation look-aside buffer 101 is updated to "1" through OR gates 115, 119 and a line 122, to indicate that the corresponding block has been referred to. When the R bit in the translation look-aside buffer 101 is already "1", the output of the AND gate 113 becomes "0", and the updating of the R bit in the buffer 101 is inhibited.

An AND gate 114 is supplied with the noncoincidence signal from the comparator 104 and the fetch request signal. In the absence of the address translation pair in the translation look-aside buffer 101, the address translation pair and the copy storage protection key are stored into the buffer 101 in the manner already described. Therefore, the output of the AND gate 114 at that time becomes "1", to update the R bit in the buffer 101 to "1".

The AND gate 116 receives the coincidence signal from the comparator 104, and a store request signal for the storage from instruction decoder 130 through a line 120. If the C bit is "0" at the time of receipt of the store request for the storage, the output of the AND gate 116 becomes "1", and the C bit in the buffer 101 is updated to "1" through an OR gate 118 as well as a line 123, to indicate that a "store" operation has been effected for storing data into the corresponding block. The output of the OR gate 118 is also applied to the OR gate 119, and the R bit is also updated to "1" through the line 122, to indicate that the corresponding block has been referred. When the C bit in the buffer 101 is already "1", the output of the AND gate 116 becomes "0", and the C bit and R bit in the buffer 101 are inhibited from being updated.

An AND gate 117 is supplied with the noncoincidence signal from the comparator 104 and the store request signal. In the absence of the address translation pair in the translation look-aside buffer 101, the address translation pair and the storage protection key are stored into the buffer 101 as in the foregoing case of the R bit. Therefore, the output of the AND gate 117 at that time becomes "1", to update the C bit and R bit in the buffer 101 to "1".

The outputs of the OR gates 118 and 119 are also applied to selectors 305, 306 in the storage control unit 3. The selectors 305, 306 lead signals from both the CUPs 1, 2 to the key storage 303 in succession. The "1" outputs of the OR gates 118, 119 update the R bit and C bit in the key storage 303 quite similarly to the updating of the R bit and C bit of the translation look-aside buffer 101, and the "0" outputs inhibit the updating.

Thus, the R bit and C bit are updated only one time at the time the first request to each block is received. Once they have been updated, no updating operation takes place thereafter while they are in the updated state. Accordingly, the contentions of the requests from other CUPs and I/O devices in the storage protection unit 301 decrease, and the processing capability of the storage control unit is prevented from being degraded due to the updating operations of the R bit and C bit, and actually can be raised in accordance with the invention.

Moreover, since the updating of the R bit and C bit is reflected upon the original R bit and C bit in the key storage, the reference to the R bit and C bit may be made to only the original R bit and C bit in the key storage without referring to the copy R bit and C bit in the translation look-aside buffer. Accordingly, the control becomes simple, and the performance of the system can be enhanced.

While, in the embodiment of FIG. 2, the copy of the storage protection keys is held in pairs with the address translation pairs within the translation look-aside buffer, another table or storage for the copy bits may well be provided separately from the translation look-aside buffer.

While the disclosed embodiment provides for all of the storage protection keys to be retained as the copy, it is a matter of course that only the C bits may be retained as a copy. In this case, the inverter 111, AND gates 113, 114 and OR gates 115 and 119 become unnecessary. A fetch request which is directed in this case to the buffer storage or cache installed in the CPU does not operate on the R bit in the key storge 303. However, when the copy of data is transferred from the main storage to the buffer storage, a request for the main storage is delivered to the storage control unit, and this is reflected upon the R bit in the key storage 303.

According to the present invention, a copy of the C bits is retained in the central processing unit, and a unit for retaining the copy is rendered fast in operation, whereby the speed of the updating of the C bits can be enhanced. Simultaneously, owing to the values of the copy C bits, requests to a storage protection unit for updating the original C bits are sent only once as to respective blocks, so that contentions between requests to the storage protection unit from other devices decrease, and enhancement in performance can be achieved.

Furthermore, a store of data into a storage is precisely reflected upon the original C bit, so that a reference to the C bit may be directed to only the original C bit. This simplifies the control and permits the enhancement of performance.

Throughout the foregoing specification and in the following claims, the term "data" is used in its most generic sense to mean any information which may be stored in a storage unit, including control information, timing signals, instructions, numerical values, addresses, device designations, etc. Thus, it should be understood that the present invention is not limited by the type of information processed and stored in the data processing system.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one or ordinary skill in the art.

What is claimed is:

1. A control system for updating change bits in a data processing system having a storage for storing data in predetermined storage information units thereof and means for providing a store request signal for effecting a storing of data into the storage, comprising: first retention means for retaining change bits each of which are provided in correspondence with a respective one of said predetermined storage information units of said storage and each of which indicates by its state whether or not a "store" operation for storing data into the corresponding storage information unit has been performed; second retention means for retaining change bits for at least some of the predetermined storage information units for which change bits are retained in said first retention means; and control means connected to said first and second retention means and responsive to a store request signal for updating the change bit in said first retention means to indicate a storing operation for storing data into the storage subject to the state of the change bit in said second retention means which corresponds to the storage information unit which is subjected to the storing operation.

2. A control system according to claim 1, wherein said control means includes means responsive to said store request signal for bringing the change bits in said first and second retention means into a status indicating that the store operation has been performed only when the change bit in said second retention means corresponding to the storage information unit which is subjected to the storage operation indicates that a store operation has not previously been performed on that storage information unit.

3. A control system according to claim 1, wherein said first retention means includes means for retaining, in correspondence with each storage information unit, access control bits, a fetch protection bit and a reference bit in addition to said change bit, while said second retention means similarly includes means for retaining copies of the access control bits and the fetch protection bit in addition to said change bit.

4. A control system according to claim 3, wherein said second retention means further includes means for retaining a copy of the reference bit.

5. A control system according to claim 4, wherein said data processing system includes means responsive to a fetch request signal for making a reference to said storage to fetch data therefrom, and wherein said control means includes means responsive to a fetch request signal for bringing the reference bits in said first and second retention means into a status indicating that a reference to the storage has been performed only when the reference bit in said second retention means corresponding to the storage information unit which is subjected to the fetch operation indicates that a reference has not previously been performed with respect to that storage information unit.

6. A control system according to claim 4, wherein said control means includes means responsive to a store operation into the storage for bringing the change bits in said first and second retention means into a status indicating that the store operation has been performed, and also for bringing the reference bits in said first and second retention means into a status indicating that a reference to the storage has been performed, only when the change bit in said second retention means corresponding to the storage information unit which is subjected to the store operation indicates that a store operation has not previously been performed on that storage information unit.

7. A control system according to claim 1, wherein said second retention means retains as a copy all of the change bits retained by said first retention means.

8. A control system according to claim 7, wherein said control means includes means responsive to said store request signal for bringing the change bits in said first and second retention means into a status indicating that the store operation has been performed only when the change bit in said second retention means corresponding to the storage information unit which is subjected to the store operation indicates that a store operation has not previously been performed on that storage information unit.

9. A control system according to claim 7, wherein said second retention means comprises a translation look-aside buffer which retains translation pairs each formed by a logical address and a real address and means for accessing said translation look-aside buffer so as to translate into the real address a logical address provided for accessing the storage, said change bits being retained in said translation look-aside buffer in correspondence with the translation pairs.

10. A control system according to claim 9, comprising registering means connected to said second retention means for registering a new translation pair in said second retention means when the translation pair indicative of a logical address which agrees with the logical address of a request for access to the storage does not exist in said second retention means; said control means including means for registering the change bit in said first retention means as a copy from said second retention means in response to operation of said registering means.

11. A control system according to claim 9, wherein said first retention means includes means for retaining, in correspondence with each storage information unit, access control bits, a fetch protection bit and a reference bit in addition to said change bit, while said second retention means similarly includes means for retaining copies of the access control bits and the fetch protection bit in addition to said translation pairs and the corresponding change bits.

12. A control system according to claim 11, wherein said second retention means further includes means for retaining a copy of the reference bit.

13. A control system according to claim 12, wherein said control means includes means responsive to a store operation into the storage for bringing the change bits in said first and second retention means into a status indicating that the store operation has been performed, and also for bringing the reference bits in said first and second retention means into a status indicating that a reference to the storage has been performed, only when the change bit in said second retention means corresponding to the storage information unit which is subjected to the store operation indicates that a store operation has not previously been performed on that storage information unit.

14. A control method for updating change bits in a data processing system having a storage for storing data in predetermined storage information units thereof and means for providing a store request signal for effecting a storing of data into the storage, comprising the steps of:

storing change bits in first retention means in correspondence with a respective one of said predetermined storage information units of said storage, said change bit indicating whether or not a "store" operation has been performed for storing data into the corresponding storage information unit;

storing a copy of said change bits in second retention means;

detecting the state of the change bit in said second retention means which relates to a selected one of said predetermined storage information units in response to a store operation for storing data into that selected storage information unit in said storage; and executing an updating operation for bringing the change bits relating to said selected storage information unit in said first and second retention means into a status indicating that the store operation has been performed with respect to said selected storage information unit, only when the change bit in said second retention means is detected to indicate that the store operation has not previously been performed with respect to the selected storage information unit.

* * * * *